(12) United States Patent
Marilly et al.

(10) Patent No.: US 9,369,666 B2
(45) Date of Patent: Jun. 14, 2016

(54) VIDEO CONFERENCE SYSTEMS IMPLEMENTING ORCHESTRATION MODELS

(71) Applicant: Alcatel Lucent, Boulogne Billancourt (FR)

(72) Inventors: Emmanuel Marilly, Nozay (FR); Alaeddine Mihoub, Nozay (FR); Abdelkader Outtagarts, Nozay (FR)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 14/424,683

(22) PCT Filed: Jun. 5, 2013

(86) PCT No.: PCT/EP2013/061544
§ 371 (c)(1),
(2) Date: Feb. 27, 2015

(87) PCT Pub. No.: WO2014/032823
PCT Pub. Date: Mar. 6, 2014

(65) Prior Publication Data
US 2015/0264306 A1    Sep. 17, 2015

(30) Foreign Application Priority Data

Aug. 29, 2012  (EP) .................................... 12182267

(51) Int. Cl.
*H04N 7/14* (2006.01)
*H04N 7/15* (2006.01)
*H04L 29/06* (2006.01)

(52) U.S. Cl.
CPC ............ *H04N 7/147* (2013.01); *H04L 65/1093* (2013.01); *H04L 65/4038* (2013.01); *H04N 7/152* (2013.01)

(58) Field of Classification Search
USPC ........... 348/14.01, 14.06, 14.08, 14.09, 14.1, 348/211.12, 333.05, E7.079, E7.081, 348/E7.084; 379/93.21, 158, 202.01, 379/205.01
See application file for complete search history.

(56) References Cited

U.S. PATENT DOCUMENTS

2005/0078172 A1*  4/2005  Harville .................. H04N 7/142
348/14.09

OTHER PUBLICATIONS

Manolis Falelakis et al: "Reasoning for video-mediated group communication", Multimedia and Expo (ICME), 2011 IEEE International Conference on, IEEE, Jul. 11, 2011, pp. 1-4.*

(Continued)

*Primary Examiner* — Yosef K Laekemariam
(74) *Attorney, Agent, or Firm* — Fay Sharpe, LLP

(57) ABSTRACT

A method for generating an output video stream in a video conference comprising receiving a plurality of input video streams of the video conference, receiving a series of observation events (52, 53, 54), the observation corresponding to actions made by participants of the video conference, Providing a plurality of orchestration models, Determining, for each of the orchestration models a probability of the series of observation events received, Selecting an orchestration model corresponding to the highest probability, Using the selected orchestration model to perform the steps of: • selecting the display state (51, 40, 41, 42) as a candidate display state, • Determining a conditional probability of the candidate display state for the received series of observation events • Determining the candidate display state providing the highest conditional probability as an updated display state, • Generating a video stream comprising the current display state and the updated display state.

15 Claims, 5 Drawing Sheets

(56) References Cited

OTHER PUBLICATIONS

Manolis Falelakis et al., "Reasoning for Video-Mediated Group Communication," International Conference on Multimedia and Expo (ICME), IEEE, pp. 1-4, XP031964795, Jul. 11, 2011.

Rene Kaiser et al, "A Rule-Based Virtual Director Enhancing Group Communication," 2012 IEEE International Conference on Multimedia and Expo Workshops, pp. 187-192, XP055046413, Aug. 16, 2012.

International Search Report for PCT/EP2013/061544 dated Sep. 6, 2013.

* cited by examiner

VIDEO CONFERENCE SYSTEMS IMPLEMENTING ORCHESTRATION MODELS

FIELD OF THE INVENTION

The invention relates to methods for generating an immersive video from multiple sources, of a plurality of persons, in particular in a multi-participant video-conferencing system.

BACKGROUND

Along with the increase of bandwidth capabilities in communication systems, video communication systems have become increasingly popular in both business and residential applications. Indeed, in the case of geographically distributed team collaboration, these systems avoid the travelling of the team collaborators and increase flexibility.

Video communication systems use audio and video telecommunications to bring people at different sites together. This can be as simple as a conversation between people in private offices or involve several multipoint sites in large rooms at multiple locations. The systems are able to manage point-to-point and multipoint communications.

In a known system, the users select with a remote control the source (video stream or camera) to be watched. Some systems improve this static behavior and switch automatically on the active speaker. This dynamic behavior is based on the audio information of each participant. With the Inview solution, InterCall introduced new capability to offer to the user to choose a template from one of the many formats that best fits his needs. Their templates are static and do not provide any dynamicity in the orchestration enabling to increase the immersion/attention of the user during the video conference. There is no programmability of the video orchestration for the user or intelligent mechanism enabling to select automatically which template fit well the user needs. In Cisco solutions (Webex and Telepresence TX9000), the active user is displayed in the main window. A fixed number of templates are available for the video orchestration. One of them is chosen by the user. The video switching behavior is managed by audio event detection. As the research has suggested, around 70 percent of the useful information is missing from audio events.

To improve the immersive communication, new techniques include an orchestrator based on a rule engine and rules templates. In a first step the rules templates set is created by an expert and cannot be modified or enhanced by a single user.

SUMMARY

In an embodiment, the invention provides a method for generating an output video stream in a video conference, the method comprising:
  Receiving a plurality of input video streams of the video conference
  Receiving a series of observation events, the observation events belonging to a plurality of observable actions corresponding to actions made by participants of the video conference,
  Providing a plurality of orchestration models, each model comprising:
    A set of display states, each one associated with a predefined screen template, each screen template comprising a selected subset of the input video streams,
    Transition probabilities between the display states,
    Observation probabilities representing the conditional probabilities of the observable actions as a function of the display states,
  Determining, for each of the orchestration models a probability of the series of observation events received,
  Selecting an orchestration model corresponding to the highest probability
  Using the selected orchestration model to perform the steps of:
    For each display state of the orchestration model, selecting the display state as a candidate display state,
    Determining a conditional probability of the candidate display state for the received series of observation events taking into account a sequence of display states including past display states and a current display state,
    Determining the candidate display state providing the highest conditional probability as an updated display state,
    Generating a video stream comprising one after the other a first sequence of images representing the screen template associated to the current display state and a second sequence of images representing the screen template associated to the updated display state.

According to embodiments, such a method can comprise one or more of the features below.

In embodiments of the method, the observable actions are selected in the group of action categories consisting of gestures, head motions, face expressions, audio actions, enunciation of keywords, actions relating to presentation slides.

In embodiments of the method, the observable actions are selected in the group consisting of:
  raising a finger, raising a hand,
  making a head top down movement, making a head right left movement,
  making a face expression that corresponds to speaking or sleeping,
  making a noise, making silence, speaking by the tutor, speaking by a participant,
  enunciating a name of an auditor or a subtitle,
  switching a slide, moving a pointer,
  beginning a question, ending a question.

In embodiments of the method, the input video streams are selected in a group consisting of: views of individual participants, views of a speaker, views of a conference room and views of presentation slides.

In embodiments of the method, a screen template comprises a predefined arrangement of the input video streams belonging to the corresponding subset.

In embodiments of the method, the transition probabilities are arranged as a transition matrix.

In embodiments of the method, the observation probabilities are arranged as an emission matrix.

In an embodiment, the invention provides also a video conference control device for generating an output video stream in a video conference, the device comprising:
  Means for receiving a plurality of input video streams of the video conference,
  Means for receiving a series of observation events, the observation events belonging to a plurality of observable actions corresponding to actions made by participants of the video conference,
  A data repository storing a plurality of orchestration models, each model comprising:

A set of display states, each one associated with a predefined screen template, each screen template comprising a selected subset of the input video streams, Transition probabilities between the display states, Observation probabilities representing the conditional probabilities of the observable actions as a function of the display states, Means for determining, for each of the orchestration models, a probability of the series of observation events received, Means for selecting an orchestration model corresponding to the highest probability, Means for using the selected orchestration model to perform the steps of:

For each display state of the orchestration model, selecting the display state as a candidate display state, Determining a conditional probability of the candidate display state for the received series of observation events taking into account a sequence of display states including past display states and a current display state, Determining the candidate display state providing the highest conditional probability as an updated display state, Generating a video stream comprising one after the other a first sequence of images representing the screen template associated to the current display state and a second sequence of images representing the screen template associated to the updated display state.

According to embodiments, such a video conference control device can comprise one or more of the features below.

In embodiments of the video conference control device, the observable actions are selected in the group of action categories consisting of gestures, head motions, face expressions, audio actions, enunciation of keywords, actions relating to presentation slides.

In embodiments of the video conference control device, the observable actions are selected in the group consisting of:

raising a finger, raising a hand, making a head top down movement, making a head right left movement, making a face expression that corresponds to speaking or sleeping, making a noise, making silence, speaking by the tutor, speaking by a participant, enunciating a name of an auditor or a subtitle, switching a slide, moving a pointer, beginning a question, ending a question.

In embodiments of the video conference control device, the input video streams are selected in a group consisting of: views of individual participants, views of a speaker, views of a conference room and views of presentation slides.

In embodiments of the video conference control device, a screen template comprises a predefined arrangement of the input video streams belonging to the corresponding subset.

In embodiments of the video conference control device, the transition probabilities are arranged as a transition matrix.

In embodiments of the video conference control device, observation probabilities are arranged as an emission matrix.

In embodiments the invention also provides a video conference system, comprising a video conference control device, connected by a communication network to a plurality of terminals, wherein each terminal comprises means for generating an input video stream and wherein the communication network is adapted to transmit the video stream from the terminals to the control device and to transmit the output video stream generated by the control device to a terminal.

In an embodiment, the invention provides also a method for generating an orchestration model of video streams in a video conference comprising a plurality of input video streams and a series of input observation events, said observation events belonging to a plurality of observable actions, the orchestration model comprising:

A set of display states, each one associated with a predefined screen template, each screen template comprising a selected subset of the input video streams of the video conference, Transition probabilities between the display states, Observation probabilities representing the conditional probabilities of the observable actions as a function of the display states the method comprising:

Providing a user input interface, the user input interface comprising:

Screen templates displaying means, for displaying said video streams arranged in accordance with the screen templates associated to the display states of the model, Observation events displaying means for displaying a current observation event, User selection means for enabling a user to select a screen template among the predefined screen templates displayed, Displaying, in a synchronized manner, the input video streams arranged in accordance with the predefined screen templates with the screen templates displaying means, Displaying, in a synchronized manner with the input video streams, the current observation events with the observation events displaying means, Recording, in a synchronized manner with the input video streams, a sequence of current display states at successive instants in time, during the display of the input video streams, in accordance with the current screen templates selected by the user at said successive instants in time, Determining numbers of transition occurrences that occurred each between two successive display states, the successive display states being different or identical, Determining the transition probabilities between all the display states from the numbers of transition occurrences, Determining numbers of observation events that occurred for each of the observable actions during the display of the input video streams, a different event counter being used for each observable action and each display state, an occurrence counter being selected and incremented each time an observation event occurs as a function of the current display state selected, at the time when the observation event occurs, Determining the observation probabilities as a function of the numbers of observation events, Storing the orchestration model in a data repository.

According to embodiments, such a method can comprise one or more of the features below.

In embodiments of the method, a transition probability $a_{ij}$ between a state i and a state j is determined by computing the formula $$a_{ij} = \frac{occ_{ij}}{\sum_{h=1}^{N} occ_{ih}}$$

with $a_{ij}$ the probability of transition from display state i to display state j, $occ_{ij}$ the number of transition occurrences from display state i to display state j and $occ_{ih}$ is the number of transition occurrences from state i to state h and N the total number of display states.

In embodiments of the method, an observation probability $b_{ik}$ is determined by computing the formula $$b_{ik} = \frac{occObs_{ik}}{\sum_{h=1}^{M} occObs_{ih}}$$

with $b_{ik}$ the probability of the observable action k given the display state i, $occObs_{ik}$ the number of observation events belonging to observable action k occurred in the display state i, $occObs_{ih}$ is the number of observation events belonging to observable action h occurred in the display state i and M the total number of observable actions.

In embodiments of the method, the method further comprises:
  Measuring a distance between the generated orchestration model and a predefined orchestration model stored in the data repository,
  Comparing the distance with a threshold,
  Wherein the storing of the generated orchestration model is only done if the distance is higher than said threshold.

In embodiments of the method, the observable actions are selected in the group of action categories consisting of gestures, head motions, face expressions, audio actions, enunciation of keywords, actions relating to presentation slides.

In embodiments of the method, the observable actions are selected in the group consisting of:
  raising a finger, raising a hand,
  making a head top down movement, making a head right left movement,
  making a face expression that corresponds to speaking or sleeping,
  making a noise, making silence, speaking by the tutor, speaking by a participant,
  enunciating a name of an auditor or a subtitle,
  switching a slide, moving a pointer,
  beginning a question, ending a question.

In embodiments of the method, the input video streams are selected in a group consisting of: views of individual participants, views of a speaker, views of a conference room and views of presentation slides.

In embodiments of the method, a screen template comprises a predefined arrangement of the input video streams belonging to the corresponding subset.

In embodiments of the method, the transition probabilities are arranged as a transition matrix.

In embodiments of the method, observation probabilities are arranged as an emission matrix.

In an embodiment, the invention provides also a video conference learning module for generating an orchestration model of video streams in a video conference comprising a plurality of input video streams and a series of input observation events, said observation events belonging to a plurality of observable actions, the orchestration model comprising:

A set of display states, each one associated with a predefined screen template, each screen template comprising a selected subset of the input video streams of the video conference, Transition probabilities between the display states, Observation probabilities representing the conditional probabilities of the observable actions as a function of the display states the video conference learning module comprising:

a user input interface, the user input interface comprising:
  Screen templates displaying means, for displaying in a synchronized manner said video streams arranged in accordance with the screen templates associated to the display states,
  Observation events displaying means for displaying a current observation event, in a synchronized manner with the input video streams,
  User selection means for enabling a user to select a screen template among the predefined screen templates displayed, Means for recording, in a synchronized manner with the input video streams, a sequence of current display states at successive instants in time, during the display of the input video streams, in accordance with the current screen templates selected by the user with the user selection means at said successive instants in time, Means for determining numbers of transition occurrences that occurred each between two successive display states, the successive display states being different or identical, Means for determining the transition probabilities between all the display states from the numbers of transition occurrences, Means for determining numbers of observation events that occurred for each of the observable actions during the display of the input video streams, a different event counter being used for each observable action and each display state, an occurrence counter being selected and incremented each time an observation event occurs as a function of the current display state selected at the time when the observation event occurs, Means for determining the observation probabilities as a function of the numbers of observation events, A data repository for storing the orchestration model.

According to embodiments, such a video conference learning module can comprise one or more of the features below.

In embodiments of the video conference learning module, a transition probability $a_{ij}$ between a state i and a state j is determined by computing the formula $$a_{ij} = \frac{occ_{ij}}{\sum_{h=1}^{N} occ_{ih}}$$

with $a_{ij}$ the probability of transition from display state i to display state j, $occ_{ij}$ the number of transition occurrences from display state i to display state j and $occ_{ih}$ is the number of transition occurrences from state i to state h and N the total number of display states.

In embodiments of the video conference learning module, an observation probability $b_{ik}$ is determined by computing the formula $$b_{ik} = \frac{occObs_{ik}}{\sum_{h=1}^{M} occObs_{ih}}$$

with $b_{ik}$ the probability of the observable action k given the display state i, $occObs_{ik}$ the number of observation events belonging to observable action k occurred in the display state i, $occObs_{ih}$ is the number of observation events belonging to observable action h occurred in the display state i and M the total number of observable actions.

In embodiments of the video conference learning module, the module further comprises:
   Means for measuring a distance between the generated orchestration model and a predefined orchestration model stored in the data repository,
   Means for comparing the distance with a threshold,
   Wherein the data repository (37) stores the generated orchestration model only if the distance is higher than said threshold.

In embodiments of the video conference learning module, the user input interface further comprises a validation button to trigger the determining of the transition probabilities and observation probabilities in response to actuation of the validation button.

In embodiments of the video conference learning module, the observable actions are selected in the group of action categories consisting of gestures, head motions, face expressions, audio actions, enunciation of keywords, actions relating to presentation slides.

BRIEF DESCRIPTION OF THE DRAWINGS

These and other aspects of the invention will be apparent from and elucidated with reference to the embodiments described hereinafter, by way of example, with reference to the drawings.

DETAILED DESCRIPTION OF THE EMBODIMENTS

Figure 1:
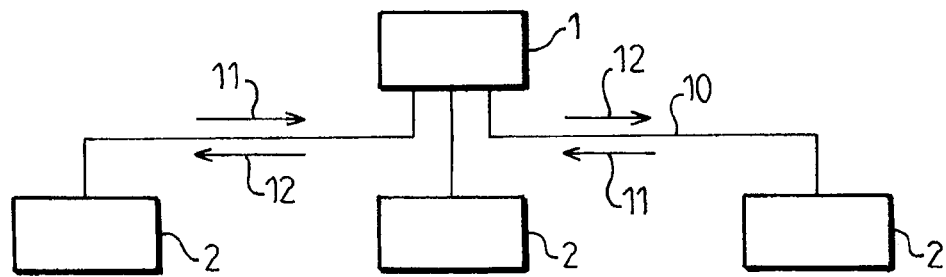
FIG. 1 is a schematic functional representation of a video conference system.

The video-conference system described below is able to deal with multiple sources to provide an enhanced immersive communication experience A video conference system is a telecommunication system able to share audio and video communications between at least two locations. This live connection between people in separate locations increases the social interaction. With reference to FIG. 1, an embodiment of a video conference system comprises a video controller 1 named orchestrator in this description and a plurality of terminals 2. These terminals are connected to the orchestrator by a communication network 10. The communication network is adapted to transmit audio and video streams. In this context, the orchestrator is able to manage different live input video streams 11 sent by the terminals 2. To create an output video, different mixing methods exist. This disclosure proposes a dynamic mixing method implemented by the orchestrator. The solution receives as inputs multimedia streams coming from the different camera of people participating to the video-conference and Video events metadata coming from the different video analyzer 32s and the metadata aggregator. The orchestrator mixes the input video streams 11 in accordance with orchestration models and screen templates 44 and generates one or more output video streams 12 which it sends to the terminals 2.

Figure 2:
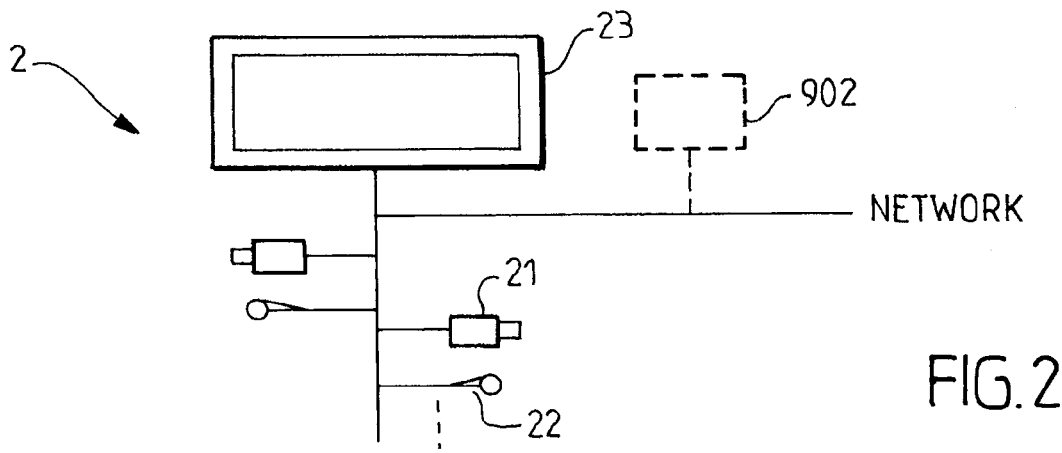
FIG. 2 is a schematic representation of a user terminal that may be used in the system of FIG. 1.

In a video conference system, the terminals 2 are located at different places in the same building or around the world. To be able to produce an immersive video conference, each terminal 2 includes some capture means. With reference to FIG. 2, a terminal 2 comprises an audio and a video capture means like a camera 21 and a microphone 22. These means are used to generate each input video stream 11. A terminal 2 includes also a display 23 to watch the output video stream 12 generated by the orchestrator 1.

Figure 3:
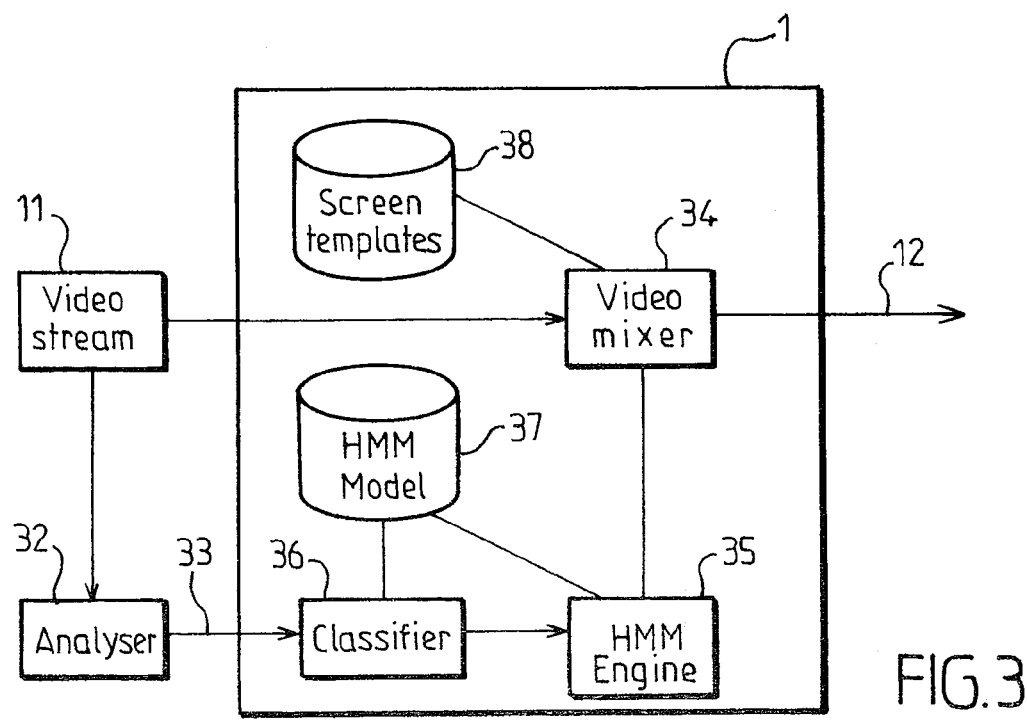
FIG. 3 is a schematic functional representation of a HMM orchestrator that may be used in the system of FIG. 1.

In reference to the FIG. 3, the orchestrator 1 performs specific functions (e.g. learning mechanisms, scenario recognition . . . ) based on Hidden Markov Models (HMM).

The orchestrator 1 takes as inputs:
   Video streams 11 coming for instance from cameras/webcams and
   Video and audio events metadata coming for instance video and audio analyzer 32s outputs or metadata aggregator.

Input video streams 11 are also transmitted to the analyzer 32. Video analyzer 32 detects video events such as gestures, postures, faces. An audio analyzer 32 detects audio events such as who is speaking, keywords, silence, and noise level.

The output video stream 12, generated by orchestrator, is mixed by the video mixer 34. The video mixer 34 uses the results of an HMM engine 35 to mix in the input video streams 11 received in accordance with predefined screen templates, as will be further explained below. The screen templates 44 are stored in a screen templates repository 38. The processes performed by the HMM engine 35 will now be described in reference to FIGS. 4 and 5.

Figure 4:
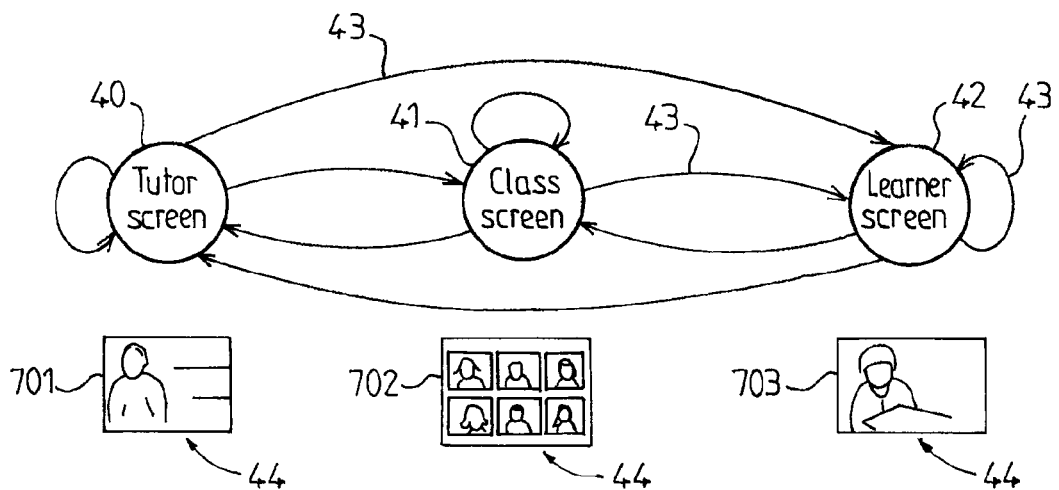
FIG. 4 is a schematic representation of the states and state transitions in an embodiment of the HMM model.

With reference to FIG. 4, a screen template 44 is a predefined disposition of at least one input video stream on a screen. The template 44 is made to organize and sometimes split a screen between different sources of information. In the example of FIG. 4, the context of the video conference is a virtual classroom. There are three: screen templates 44, the tutor screen templates 701 showing a single view of the tutor, the virtual class screen template 702 with a mosaic of views of participants and a learner screen template 703 showing a participant who wishes to ask a question for example. In the HMM, each screen template 44 is linked with a display state. In this HMM example of FIG. 4, there are three display states (tutor screen state 40, class screen state 41 and learner screen state 42). A transition matrix A of the HMM model defines the transitions 43 between these states.

Figure 5:
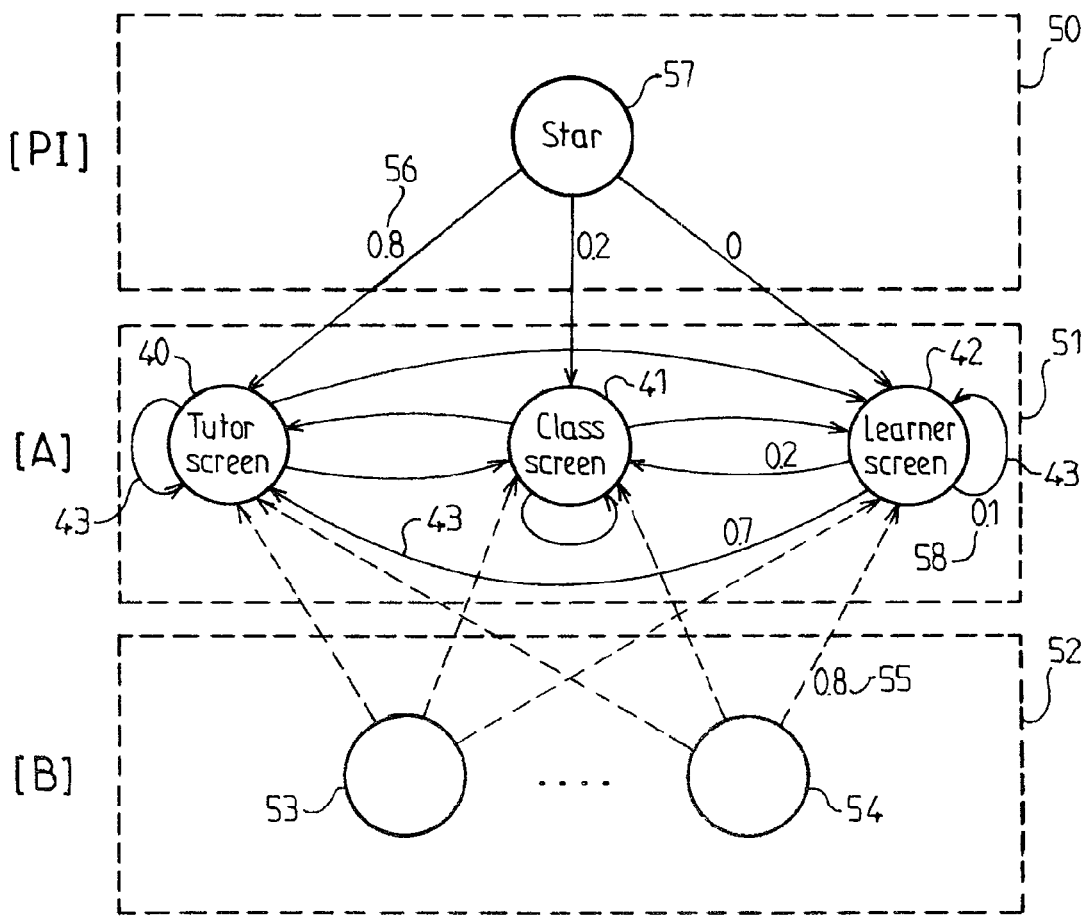
FIG. 5 is a further view of the HMM model of FIG. 4, showing also the observable actions.

To provide further details of the model, the FIG. 5 represents also an initial screen state 57, and the states 40, 41, 42 mentioned above. This figure also shows a plurality of observable actions:
tutor is speaking 53
raising a hand 54.
These are examples of the observable actions that can be detected by the analyzer 32.

In an embodiment, the HMM engine 35 deals with 16 observable actions. These observable action actions two Gestures (raising a finger, raising a hand), two Motions (making a head top down movement, making a head right left movement), two Face Expressions (making a face expression that corresponds to speaking (Face+Speech/Lips are moving), or sleeping (No eyes/Eyes closed/Face not behind the screen)), two Keyword actions (enunciating a name of the an auditor or a subtitle), four Audio actions (speaking by the tutor, speaking by the learner, making noise, making silence), two Slide actions (switching a slide, moving a pointer), and two Sub events (beginning a question, ending a question).

The FIG. 5 shows also the probabilities 55 of an observation event to occur in a determined display state. There is one probability for each couple [observation event, display state]. FIG. 5 also shows the probabilities 58, associated to each transition 43 between two states and the initialization probabilities 56.

The Hidden Markov Model (HMM) is represented with an initialization matrix 50, a transition matrix 51 and an emission matrix 52. This discrete HMM method provides the basis of the dynamic mixing behavior. To describe the HMM method, the following notations are defined:

$Q=\{q_1, q_2, \ldots, q_N\}$: Set of display states; each state represents a screen templates.
N=Number of display states
$V=\{v_1, v_2, \ldots, v_M\}$: Set of observable actions.
M=Number of observable actions
T=Length of observation sequence
$O=\{o_1, o_2, \ldots, o_T\}$: Observed sequence of observation events
$S=\{s_t\}$ with $s_t$ the display state at t time The model is completely defined by the formula: $\lambda=(A,B,\pi)$ and also named orchestration model.

A is the transition matrix, B the emission matrix and $\pi$ is the initialization matrix. In our model, A contains transition probabilities between the display states, i.e. diverse camera views; B contains emission probabilities of each observable action knowing the current display state; $\pi$ contains the probability that a display state will be showed in the first place. The three matrixes are mathematically described as follow:

$$A=\{a_{ij}|a_{ij}=Pr(s_{t+1}=q_i|s_t=q_j)\} \quad (1)$$

$$B=\{b_{jk}|b_{jk}=Pr(o_t=v_k|s_t=q_j)\} \quad (2)$$

$$\pi=\{\pi_i|\pi_i=Pr(s_1=q_i)\} \quad (3)$$

The orchestration model described above is used by the HMM engine 35 of the orchestrator 1 described with the FIG. 3. The goal of the HMM engine 35 is to forecast the best suitable screen templates, using the orchestration model $\lambda$ and the observation sequence O. The observation sequence O is provided by the analyzer 32. The function of the HMM engine 35 is a decoding function. This function consists of getting the most likely sequence of display states given an observations sequence and the HMM model. To find the best display state sequence $Q_{optimal}$, the following equation is solved:

$$Q_{optimal}=\arg\max_Q Pr(Q|\lambda,O) \quad (4)$$

To solve Equation (4) the HMM engine 35 uses the Viterbi algorithm. In the course of time, the decoding is done at a given clock rate by the HMM engine 35. The decoding results in a sequence of states in the course of time. The HMM engine 35 orchestrates the video through the video mixer 34.

In the above decoding process, a single HMM model as illustrated in FIGS. 4 and 5 was exploited. In another embodiment, the orchestrator 1 has a plurality of orchestration models.

To add more flexibility, for that purpose the orchestrator 1, includes a HMM model repository 37. This repository 37 stores a plurality of predefined orchestration models. In an embodiment, it is possible for the user to select an orchestration model $\lambda$ used by the HMM engine 35, in the current video conference session.

To increase the immersive perception, a further embodiment of the orchestrator 1 proposes also a dynamical selection of the orchestration model used by the HMM engine 35. The orchestrator 1 is able to recognize the video orchestration model that best fits the video conference context or scenario and the user profile. This is the goal of the classifier 36 to identify dynamically which orchestration model $\lambda$ available in the HMM repository 37 is the best suited to the current use case.

Initially, based on the first received video and audio observation events, the classifier 36 selects the HMM orchestration model that fits best the temporal sequence of observation events. During the video conference session, the classifier 36 can change the HMM model if another one better fits the temporal sequence of observation events.

This function of selecting the right model is a recognition function: given an observation sequence and different HMM models, the classifier 36 chooses the HMM orchestration model which best matches these observations. For n models $(\lambda_{i,i=1\ldots n})$ the classifier 36 select the optimal model $\lambda_{optimal}$ where:

$$\text{optimal}=\arg\max_i Pr(O|\lambda_i) \quad (5)$$

The classifier 36 implements this function with a Forward algorithm or a Backward algorithm.

In this embodiment, the orchestrator 1 is able to provide smart video orchestration capabilities. The system is more flexible and more dynamic.

In a further embodiment it is also possible to enrich the orchestration capabilities by generating new orchestration models. In order to enable a user to create new orchestration models another embodiment of the orchestrator 1 shown on FIG. 6 comprises a learning function.

The learning process enables a non-expert user to create their own orchestration models based on their uses without any technical skills. It is implemented by 3 modules: the user learner interface 700, the user activities recorder 602 and the HMM generator 603.

In live and depending on the observation events, the user selects which main video stream has to be displayed by the orchestrator 1. The learning module 601 records the display states selected by the user in the course of time and observation events and generates a new HMM model or update an existing model with the associated probabilities based on the selections of the user.

Figure 7:
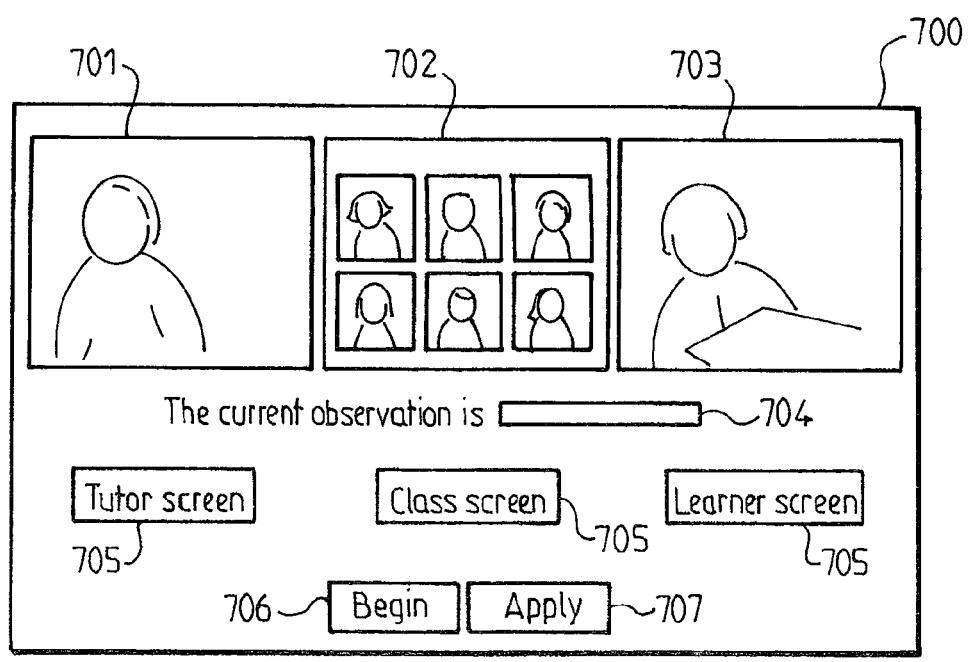
FIG. 7 is a functional representation of a user learning interface.

With reference to the FIG. 7, an example of a graphical user learner interface 700 displays the different screen templates showing the different input video streams 11. This example proposes three display states: a tutor screen 701, a screen of a general view of the class 702, and a screen on a specific learner 703. An observation event window 704 displays the current observation events in the course of time.

The user learning interface 700 includes also some input mean, like buttons 705 to allow the user to make a choice between the different screens. A button 706 serves to start a new recording sequence. A button 707 serves to terminate and validate the recording sequence. Actuation of button 707 causes the learning module 601 to record the choices made by the user and then generate the corresponding orchestration model.

In the training process, for each observation event that arises, the user is invited to choose a screen template, i.e. to select in fact the corresponding display state of the HMM model to be generated.

When the user starts a recording sequence, the video streams are displayed. When an observation event occurs, the user is invited to select a screen with the screen buttons 705 and in the end the user validates his choices with the button 707. The user inputs are recorded and translated into a HMM orchestration model λ that can be stored in the HMM repository 37. The learning module 601 is also able to update an existing model.

The model creation feature is very interesting to improve the immersive communication quality result. However, it may not be useful to store a model is very similar to an already existing model. In an embodiment, the learning module 601 is able to measure the distance between a new model and the models already stored in the HMM repository 37. The learning module 601 measures the dissimilarity between different HMMs model with the Kullback Leibner distance. In summary the user can personalize an existing orchestration model. But he can also create a new orchestrator model; the module records the choosing done by the user and creates a new HMM model from these observations. Then the Kullback Leibner distance is used to decide if this template is different enough from the existing ones in order to be saved and validated.

As described above, it is necessary to initialize the model parameters λ=(A,B,π) to create it. A process implemented by the learning module 601 comprises the following steps:

1. Initialization Matrix Training

The training of the initialization matrix π is made with the initialization probability: the first state selected by the user is set to 1 and the others to 0.

2. Transition Matrix Training

In the training process, for each observation, the user will be invited to choose between screen templates. As a result a sequence of display states will be recorded.

The algorithm of the training of the transition matrix A is composed of 4 steps:

Step1: Get the number of display states for the HMM inputted.

Step2: Generate a comparison matrix that contains all possible transitions between the display states.

Step3: Browse the states sequence and increment counters in an occurrence matrix. The occurrence matrix is a matrix which contains the occurrence for each transition between two states i and j. The comparison matrix, the occurrence matrix and the transition matrix A have the same dimensions N×N.

Step4: the occurrence matrix, the transition matrix is computed as follows; for each line we divide each value by the sum of this line.

This is summarized by this formula:

$$a_{ij} = \frac{occ_{ij}}{\sum_{h=1}^{N} occ_{ih}} \quad (6)$$

Occ is the occurrence matrix coefficient.

3. Emission Matrix Training

For each state the module counts separately the observation events of each observable action. Then this number is divided by the total number of observation events occurred in the same display state. It is summarized by the formula:

$$b_{ik} = \frac{occObs_{ik}}{\sum_{h=1}^{M} occObs_{ih}} \quad (7)$$

With occObs representing the occurrence matrix for each observable action and each display state, with dimensions N×M.

Figure 6:
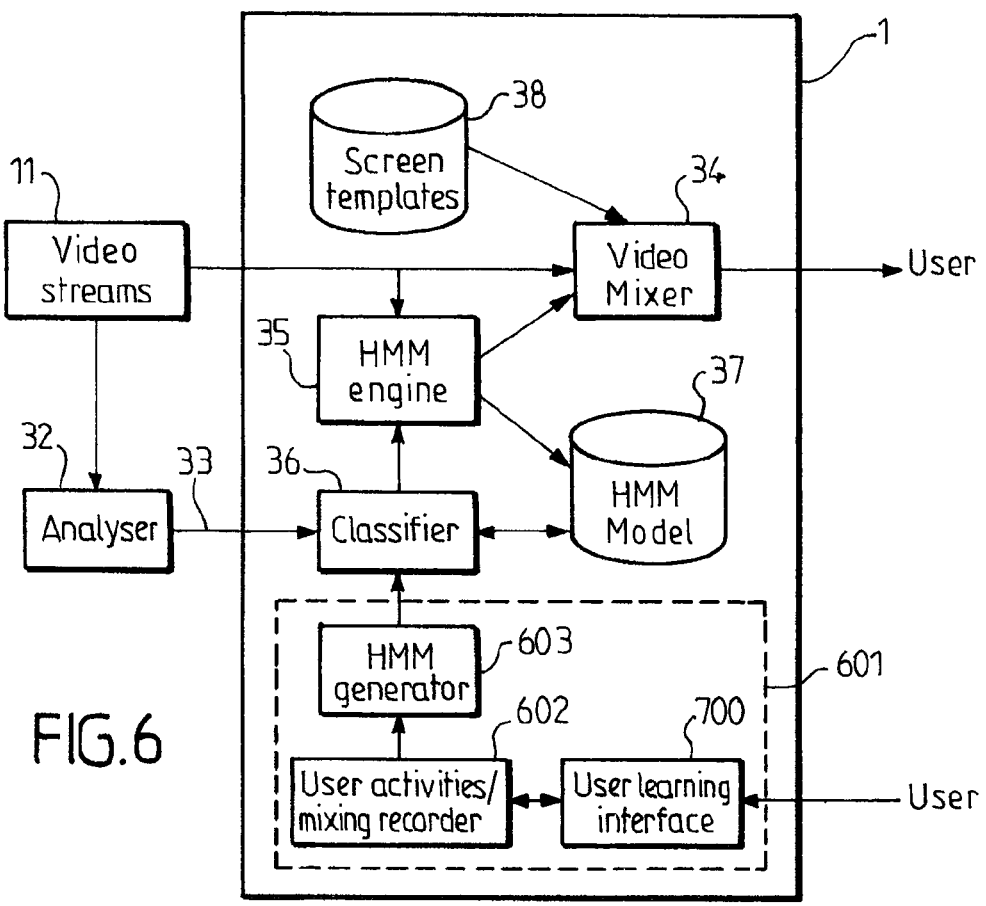
FIG. 6 is a schematic view of another embodiment of the HMM orchestrator.

With reference to FIG. 6, now we describe an embodiment which includes a Learning module 601, a user learning interface 700, a user activities recorder 602 and an HMM generator 603. The Learning module 601 receive the user inputs through the user learning interface 700, records the decisions of this user with the user activities recorder 602 and computes a HMM model with the HMM generator 603. The result is stored in the HMM model repository 37. The other modules of the orchestrator 1 shown on FIG. 6 are similar to those of FIG. 3.

Figure 8:
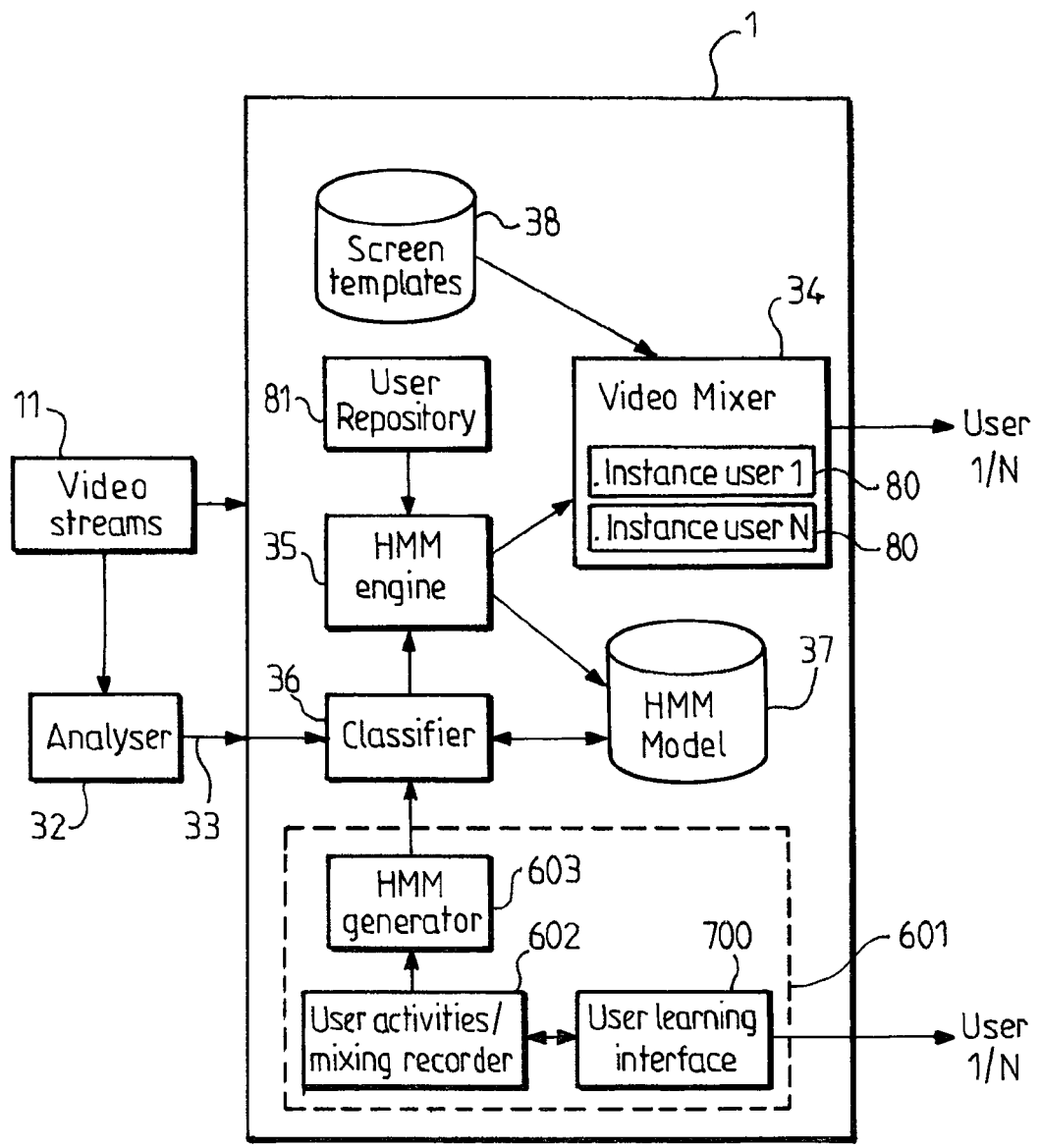
FIG. 8 is a schematic view of another embodiment of the HMM orchestrator.

With reference to FIG. 8, another embodiment of the orchestrator 1 integrates the learning module 601 and with a centralized video mixer 34 supporting several instances 80. By contrast with the embodiment of FIG. 6, the Video mixer 34 module support different instances 80 of video displaying in a centralized manner. Each user is able to create and personalize his owns video orchestration and to receive a personalized orchestrated video stream. The video orchestration is done in the several video mixer instances 80. Users have just to see them (i.e. no video orchestration on the user devices). The "user repository" 81 module is use to manage the different users (id, profile, orchestration model, etc. . . . )

Figure 9:
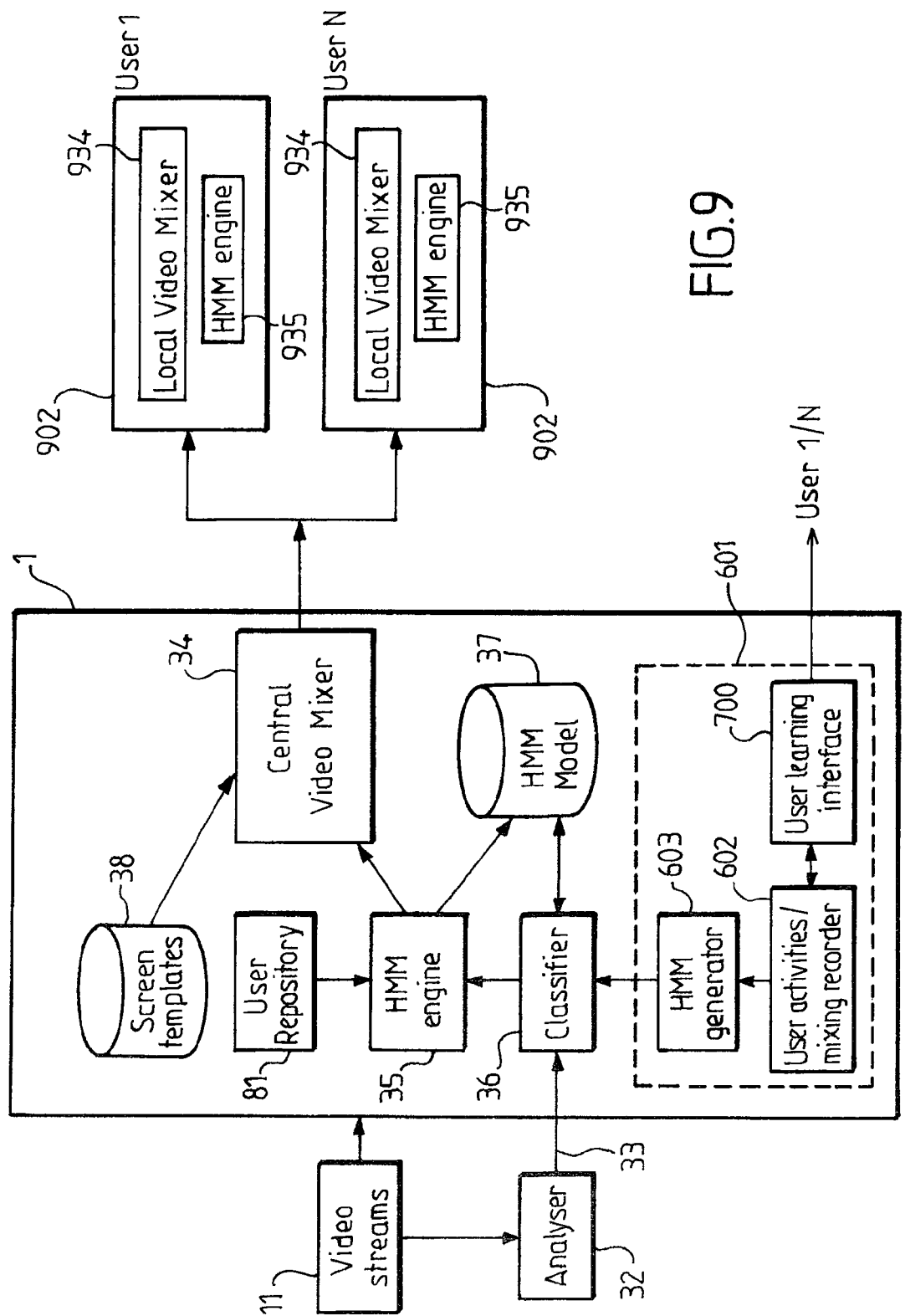
FIG. 9 is a schematic view of another embodiment of the HMM orchestrator.

With reference to FIG. 9, an embodiment of the orchestrator 1 comprises the learning module 601 whereas the video mixers 34 and the HMM engines 35 are distributed in the remote terminals 2. This implementation enables to implement the orchestration closer to the user in order to avoid too much processing on the server. The HMM orchestration model selected by the orchestrator 1 is uploaded on the user terminal 2. A local video orchestrator 902 uses this orchestration model to compose the video streams coming from the server. The local video orchestrator 902 comprises a local video mixer 934 and an HMM engine 935. The local video orchestrator 902 is also shown on FIG. 2. Only video streams required by the local video orchestrators are sent by the central video mixer 34. A user can personalize or define its own model locally and store or share them on the central server. In the case the local orchestrator interacts with the central HMM manager, engine, mixer, template and learner.

Elements such as the control units could be e.g. hardware means like e.g. an ASIC, or a combination of hardware and software means, e.g. an ASIC and an FPGA, or at least one microprocessor and at least one memory with software modules located therein.

The invention is not limited to the described embodiments. The appended claims are to be construed as embodying all modification and alternative constructions that may be occurred to one skilled in the art, which fairly fall within the basic teaching here, set forth.

The use of the verb "to comprise" or "to include" and its conjugations does not exclude the presence of elements or steps other than those stated in a claim. Furthermore, the use of the article "a" or "an" preceding an element or step does not exclude the presence of a plurality of such elements or steps.

In the claims, any reference signs placed between parentheses shall not be construed as limiting the scope of the claims.

The invention claimed is:

1. A method for generating an output video stream in a video conference comprising:
   Receiving a plurality of input video streams of the video conference
   Receiving a series of observation events, the observation events belonging to a plurality of observable actions corresponding to actions made by participants of the video conference,
   Providing a plurality of orchestration models, each model comprising:
      A set of display states, each one associated with a predefined screen template, each screen template comprising a selected subset of the input video streams,
      Transition probabilities between the display states,
      Observation probabilities representing the conditional probabilities of the observable actions as a function of the display states,
   Determining, for each of the orchestration models a probability of the series of observation events received,
   Selecting an orchestration model corresponding to the highest probability
   Using the selected orchestration model to perform:
      For each display state of the orchestration model, selecting the display state as a candidate display state,
      Determining a conditional probability of the candidate display state for the received series of observation events taking into account a sequence of display states including past display states and a current display state,
      Determining the candidate display state providing the highest conditional probability as an updated display state,
      Generating a video stream comprising one after the other a first sequence of images representing the screen template associated to the current display state and a second sequence of images representing the screen template associated to the updated display state.

2. A method according to claim 1, wherein the observable actions are selected in the group of action categories of gestures, head motions, face expressions, audio actions, enunciation of keywords, actions relating to presentation slides.

3. A method according to claim 1, wherein the observable actions are selected in the group of:
   raising a finger, raising a hand,
   making a head top down movement, making a head right left movement,
   making a face expression that corresponds to speaking or sleeping,
   making a noise, making silence, speaking by the tutor, speaking by a participant,
   enunciating a name of an auditor or a subtitle,
   switching a slide, moving a pointer,
   beginning a question, ending a question.

4. A method in accordance with claim 1, wherein the input video streams are selected in a group of: views of individual participants, views of a speaker, views of a conference room and views of presentation slides.

5. A method in accordance with claim 1, wherein a screen template comprises a predefined arrangement of the input video streams belonging to the corresponding subset.

6. A method in accordance with claim 1, wherein the transition probabilities are arranged as a transition matrix.

7. A method in accordance with claim 1, wherein observation probabilities are arranged as an emission matrix.

8. A video conference control device for generating an output video stream in a video conference, the device comprising:
   Means for receiving a plurality of input video streams of the video conference,
   Means for receiving a series of observation events, the observation events belonging to a plurality of observable actions corresponding to actions made by participants of the video conference,
   A data repository storing a plurality of orchestration models, each model comprising:
      A set of display states, each one associated with a predefined screen template, each screen template comprising a selected subset of the input video streams,
      Transition probabilities between the display states,
      Observation probabilities representing the conditional probabilities of the observable actions as a function of the display states,
   Means for determining, for each of the orchestration models, a probability of the series of observation events received,
   Means for selecting an orchestration model corresponding to the highest probability,
   Means for using the selected orchestration model to perform the steps of:
      For each display state of the orchestration model, selecting the display state as a candidate display state,
      Determining a conditional probability of the candidate display state for the received series of observation events taking into account a sequence of display states including past display states and a current display state,
      Determining the candidate display state providing the highest conditional probability as an updated display state,
      Generating a video stream comprising one after the other a first sequence of images representing the screen template associated to the current display state and a second sequence of images representing the screen template associated to the updated display state.

9. A video conference control device according to claim 8, wherein the observable actions are selected in the group of action categories of gestures, head motions, face expressions, audio actions, enunciation of keywords, actions relating to presentation slides.

10. A video conference control device in accordance with claim 8, wherein the observable actions are selected in the group of:
   raising a finger, raising a hand,
   making a head top down movement, making a head right left movement, making a face expression that corresponds to speaking or sleeping,
making a noise, making silence, speaking by the tutor, speaking by a participant,
enunciating a name of an auditor or a subtitle,
switching a slide, moving a pointer,
beginning a question, ending a question.

11. A video conference control device in accordance with claim 8, wherein the input video streams are selected in a group of: views of individual participants, views of a speaker, views of a conference room and views of presentation slides.

12. A video conference control device in accordance with claim 8, wherein a screen template comprises a predefined arrangement of the input video streams belonging to the corresponding subset.

13. A video conference control device in accordance with claim 8, wherein the transition probabilities are arranged as a transition matrix.

14. A video conference control device in accordance with claim 8, wherein observation probabilities are arranged as an emission matrix.

15. A video conference system comprising a video conference control device in accordance with claim 8, connected by a communication network to a plurality of terminals, wherein each terminal comprises means for generating an input video stream and wherein the communication network is adapted to transmit the video stream from the terminals to the control device and to transmit the output video stream generated by the control device to a terminal.

* * * * *